(12) United States Patent
Twelves, Jr. et al.

(10) Patent No.: US 11,097,350 B2
(45) Date of Patent: Aug. 24, 2021

(54) PRE-FUSION LASER SINTERING FOR METAL POWDER STABILIZATION DURING ADDITIVE MANUFACTURING

(71) Applicant: United Technologies Corporation, Farmington, CT (US)

(72) Inventors: Wendell V. Twelves, Jr., Glastonbury, CT (US); David Ulrich Furrer, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 589 days.

(21) Appl. No.: 15/658,127

(22) Filed: Jul. 24, 2017

(65) Prior Publication Data

US 2019/0022752 A1    Jan. 24, 2019

(51) Int. Cl.
| | |
|---|---|
| *B22F 3/105* | (2006.01) |
| *B22F 12/00* | (2021.01) |
| *B33Y 10/00* | (2015.01) |
| *B33Y 30/00* | (2015.01) |
| *B33Y 70/00* | (2020.01) |

(Continued)

(52) U.S. Cl.
CPC .............. *B22F 12/00* (2021.01); *B22F 5/009* (2013.01); *B22F 5/04* (2013.01); *B22F 10/37* (2021.01); *B23K 26/342* (2015.10); *B33Y 10/00* (2014.12); *B33Y 30/00* (2014.12); *B33Y 70/00* (2014.12); *B33Y 80/00* (2014.12); *C22C 1/0433* (2013.01); *C22C 1/0458* (2013.01); *C22C 33/02* (2013.01); *B22F 10/10* (2021.01); *B22F 2201/10* (2013.01); *B22F 2201/20* (2013.01)

(58) Field of Classification Search
CPC .............................. B22F 3/1055; B22F 10/37
See application file for complete search history.

(56) References Cited

U.S. PATENT DOCUMENTS

| | | |
|---|---|---|
| 9,505,172 B2 | 11/2016 | Ljungblad |
| 2015/0064048 A1 | 3/2015 | Bessac et al. |

(Continued)

FOREIGN PATENT DOCUMENTS

| | | |
|---|---|---|
| WO | WO2014095208 A1 | 6/2014 |
| WO | WO2017/015241 A1 | 1/2017 |

OTHER PUBLICATIONS

Communication Pursuant to Article 94(3) EPC for EP Application No. 18185256.7, dated Jan. 22, 2020, 5 pages.

(Continued)

*Primary Examiner* — Christopher S Kessler
(74) *Attorney, Agent, or Firm* — Kinney & Lange, P.A.

(57) ABSTRACT

In an embodiment, an apparatus for forming a metal component from alloy powder includes a powder-based layer-by-layer directed energy beam additive manufacturing system, a primary directed high energy beam, configured to raise a temperature of the alloy powder to or above the melting point of the alloy powder. A secondary directed low energy beam configured to raise the temperature of the alloy powder to or above a sintering point of the alloy powder without reaching the melting point of the alloy powder. The apparatus further includes a sintered region on the surface of an alloy powder layer previously produced by the secondary directed low energy beam and a solid region forming a portion of the metal component that was solidified from a molten pool on the surface of the alloy powder layer adjacent to the first sintered region having been produced by the primary directed high energy beam.

10 Claims, 3 Drawing Sheets

(51) Int. Cl.
*B33Y 80/00* (2015.01)
*B23K 26/342* (2014.01)
*B22F 5/00* (2006.01)
*C22C 1/04* (2006.01)
*B22F 5/04* (2006.01)
*C22C 33/02* (2006.01)
*B22F 10/37* (2021.01)
*B22F 10/10* (2021.01)

(56) References Cited

U.S. PATENT DOCUMENTS

| | | |
|---|---|---|
| 2015/0306820 A1 | 10/2015 | Colin et al. |
| 2016/0167160 A1 | 6/2016 | Hellestam |
| 2016/0318104 A1 | 11/2016 | Cott et al. |
| 2016/0325541 A1 | 11/2016 | Lavrentyev et al. |
| 2016/0332371 A1 | 11/2016 | Staroselsky et al. |
| 2016/0354843 A1 | 12/2016 | Lacy et al. |
| 2017/0008126 A1 | 1/2017 | Long et al. |
| 2017/0113303 A1 | 4/2017 | Rockstroh et al. |

OTHER PUBLICATIONS

Extended European Search Report for EP Application No. 18185256.7, dated Oct. 5, 2018, 7 pages.
Communication Pursuant to Article 94(3) EPC for EP Application No. 18185256.7, dated Dec. 14, 2020, 5 pages.

PRE-FUSION LASER SINTERING FOR METAL POWDER STABILIZATION DURING ADDITIVE MANUFACTURING

BACKGROUND

This invention relates generally to the field of additive manufacturing and more particularly to a powder-based additive manufacturing system with a feature designed to stabilize the powder composition during melting.

Traditional additive manufacturing systems include, for example, additive layer manufacturing (ALM) devices, such as direct metal laser sintering (DMLS), selective laser melting (SLM), laser beam melting (LBM) and electron beam melting (EBM) that provide for the fabrication of complex metal, alloy, ceramic and composite structures by a layer-by-layer freeform construction of a workpiece. The principle behind additive manufacturing processes involves the selective melting of atomized precursor powder beds by a directed energy source, producing a lithographic buildup of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. These devices are directed by three dimensional geometry solid models developed in computer aided design (CAD) software systems.

The DMLS, SLM, and LBM systems utilize a laser as the energy source and the EBM system utilizes an electron beam gun. Both system beam types are focused by a lens, then deflected by a rotating mirror or an electromagnetic scanner so that the energy beam selectively impinges on a powder bed. The DMLS, SLM, and LBM systems utilize a focused laser beam scanned by a rotating mirror and the EBM system uses a beam of electrons focused with electromagnetic lenses that scan the powder bed. The powder is melted at the energy focus site on the build surface or substrate. The strategy of the scanning, power of the energy beam, resonance time or speed, and sequence of melting are directed by an imbedded computer aided design system (CAD). The precursor powder is either gravitationally fed from cassettes or loaded by a piston so that it can be raked onto the build table. The excess powder is raked off and collected for reapplication. Since the energy beam source may be fixed, the build table may lower with each successive layer so that the work piece is built upon the underlying pre-solidified layer beneath.

Because of the high concentration of energy in the melt pools, thermally driven turbulence on the surface of the powder bed can cause, for example, powder or liquid loss from the melt pools which can lead to, for example, an inconsistent layer.

SUMMARY

In an embodiment, a method of forming a metal component includes forming a first layer of metal powder on a work surface and heating firstly a first region of a top surface of the first layer with a low energy directed energy beam with a first diameter to a temperature at which the metal powder at or near the top surface is sintered to form a first skull on the first layer to encapsulate the metal powder in the first region to prevent powder loss during a second heating step. A first spot of the first region is then heated secondly to a temperature at or above the melting point of the metal powder with a high energy directed energy beam with a second diameter smaller than the first diameter to form a first molten pool. The process is continued by heating thirdly a second region of the top surface of the first powder layer upstream and adjacent the first molten pool with the low energy directed energy beam to a temperature at which the particles at or near the top surface sinter to form a second skull on the first layer to encapsulate the metal powder in the second region of the layer to prevent powder loss during a fourth heating step. The process continues by heating fourthly, a second spot of the second region of the first layer to a temperature at or above the melting point of the metal powder with the high energy directed energy beam to form a second molten pool downstream from the first molten pool. The process is continued by heating fifthly a third region of the top surface of the first layer upstream and adjacent the molten pool with the low energy directed energy beam to a temperature at which the metal powder at or near the top surface is sintered to form a third skull on the first layer to encapsulate the metal powder in the third region to prevent powder loss during a subsequent heating step. The five previous heating steps are repeated until the top surface of the first layer comprises a fused surface. A second layer of metal powder is formed on the first layer and the heating steps, the repeating steps and the forming steps are repeated until the metal component is formed.

In another embodiment, an apparatus for forming a metal component from alloy powder includes a powder-based layer-by-layer directed energy beam additive manufacturing system, a primary directed high energy beam, configured to raise a temperature of the alloy powder to or above the melting point of the alloy powder. A secondary directed low energy beam configured to raise the temperature of the alloy powder to or above a sintering point of the alloy powder without reaching the melting point of the alloy powder. The apparatus further includes a sintered region on the surface of an alloy powder layer previously produced by the secondary directed low energy beam and a solid region forming a portion of the metal component that was solidified from a molten pool on the surface of the alloy powder layer adjacent to the first sintered region having been produced by the primary directed high energy beam.

DETAILED DESCRIPTION

Figure 1:
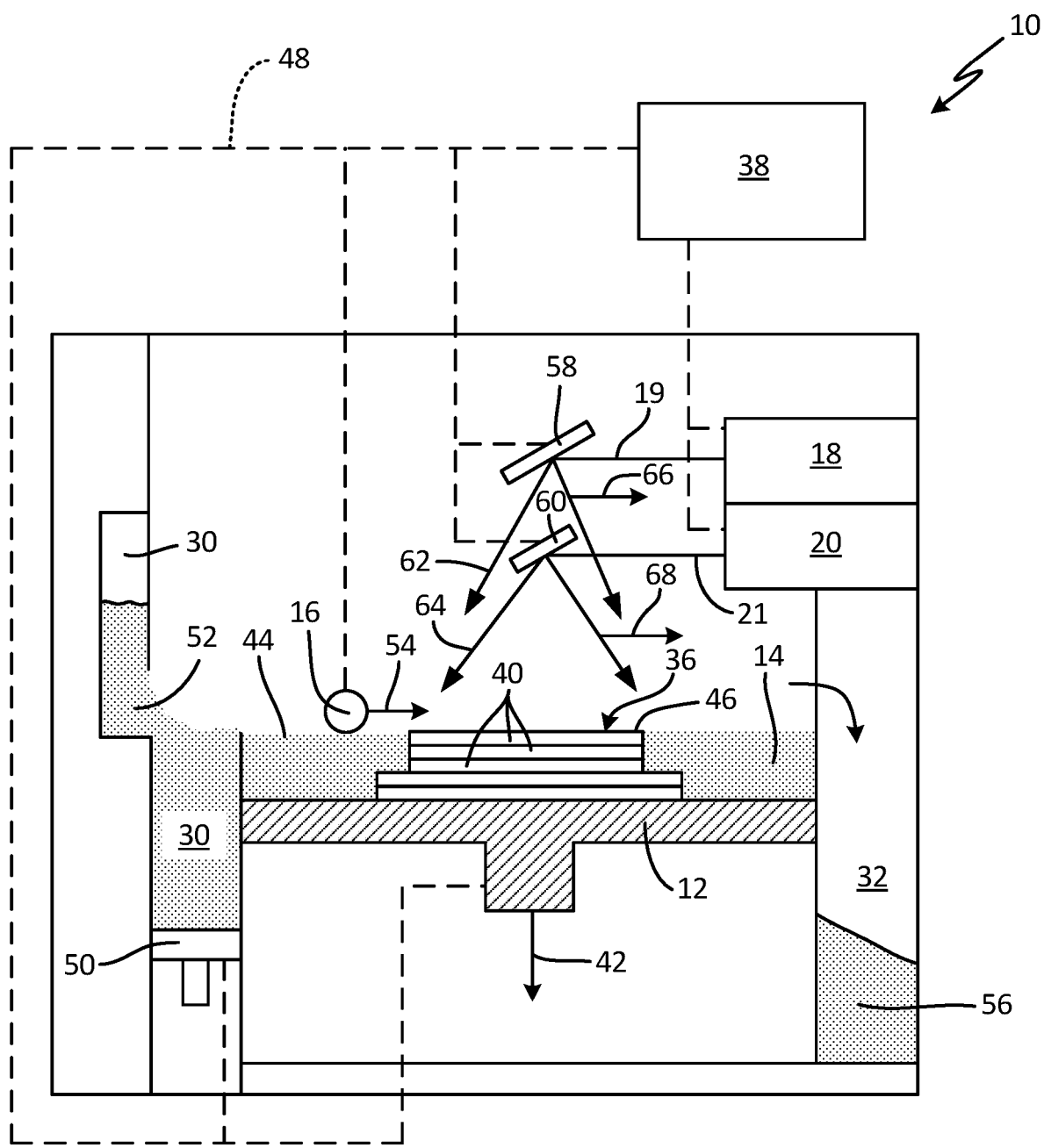
FIG. 1 is a schematic view of an additive manufacturing system.

Directed energy beam powder bed additive manufacturing processes typically employ a directed energy beam heat source to create a molten melt pool from powder feed stock. In an embodiment, the powder may be a metal powder, such as a nickel base, cobalt base, iron base, superalloy powder or mixtures thereof or titanium alloy powder. In the process, solid, three-dimensional parts are created in a layer by layer build. An example is shown in FIG. 1. FIG. 1 schematically illustrates additive manufacturing system 10 according to one non-limiting example of the present disclosure that may have a build table 12 for holding a powder bed 14 over build table 12, a particle spreader or wiper 16 for spreading powder bed 14 over build table 12, directed energy guns 18 and 20 for selectively heating and melting regions of a layer of powder bed 14, a powder supply hopper 30 for supplying powder to spreader 16 and a powder surplus hopper 32. Additive manufacturing system 10 may be configured to build a workpiece 36 in a layer-by-layer fashion.

A controller 38 can include an integral CAD system for modeling and/or dividing the workpiece 36 into a plurality of slices 40 additively built atop one other generally in a vertical or Z coordinate direction (see arrow 42). Once manufactured, each solidified slice 40 corresponds to a layer 44 of the powder bed 14 prior to solidification. Layer 44 is placed on top of a build surface 46 of the previously solidified slice 40. Controller 38 generally operates the entire system through a series of electrical and/or digital signals 48 sent to the system 10 components. For instance, controller 38 may send a signal 48 to mechanical piston 50 of supply hopper 30 to sequentially push a supply of powder 52 upward for receipt by spreader 16, or alternatively or in addition thereto, supply hopper 30 may feed powder downward via gravity. Spreader 16 may be a wiper, roller or other device that pushes (see arrow 54) or otherwise places the supply powder 52 over build surface 46 of workpiece 36 by a predetermined thickness established through downward movement (see arrow 42) of build table 12 controlled by controller 38. Any excess powder 56 may be pushed into the surplus hopper 32 by spreader 16. It is further contemplated and understood that layer 44 may take the form of any substrate that may be laid or applied across build surface 46 in preparation for melting.

Once a substantially level powder layer 44 is established over build surface 46, controller 38 may send a signal 48 to the directed energy guns 18 and 20 and associated mirror systems 58 and 60 to activate and generally move energy beams 62 and 64 along top layer 46 at a controlled velocity and controlled direction (see arrows 66 and 68) and thereby selectively melt top layer 44 on a region by region basis into melt pools.

In a non-limiting embodiment, energy guns 18 and 20 may be fixed sources of energy beams 19 and 21 that are deflected and focused by moveable physical or electronic mirror systems 58 and 60 respectively.

In another non-limiting embodiment, energy guns 18 and 20 may be mounted on a moveable carrier that may physically traverse the area of workpiece 36 and perform the same function as schematic deflecting and focusing systems 58 and 60.

It is further contemplated and understood that energy beams 19 and 21 may be laser beams, electron beams or any other energy beams capable of heating the powder to sufficient temperatures and at sufficient rates to perform the necessary function of forming a melt pool and, following solidification, a weld bead. For instance, beams with shorter wavelengths may heat up the powder faster than beams with longer wavelengths. Different optical frequencies or wavelengths typically require different types of laser; for example, $CO_2$ lasers, diode lasers, and fiber lasers. However, to preselect the best wavelength (and thus laser type) for heating and/or melting, the wavelength selected can be based on the composition of the metal powder, for example. That is, particles of a powder can have different heat absorption rates, impacting melting rates and solidification rates. Moreover, and besides wavelength, other properties of the beam may be a factor. For instance, pulsed laser beams or continuous laser beams can be desired to melt the powder. It is also understood that the two energy source devices 18 and 20 may perform different functions. In an embodiment, for example, the embodiment of FIG. 3, energy source device 18 may be a relatively low power device and energy source 20 may be a high power device. One device may be used to preheat a desired region to be melted and the other device may be used to form a small melt pool in the preheated region. As discussed later, this flexibility provides a major justification of the present invention. In other embodiments, both energy sources may be focused at the same time on the same region, if necessary.

Figure 2:
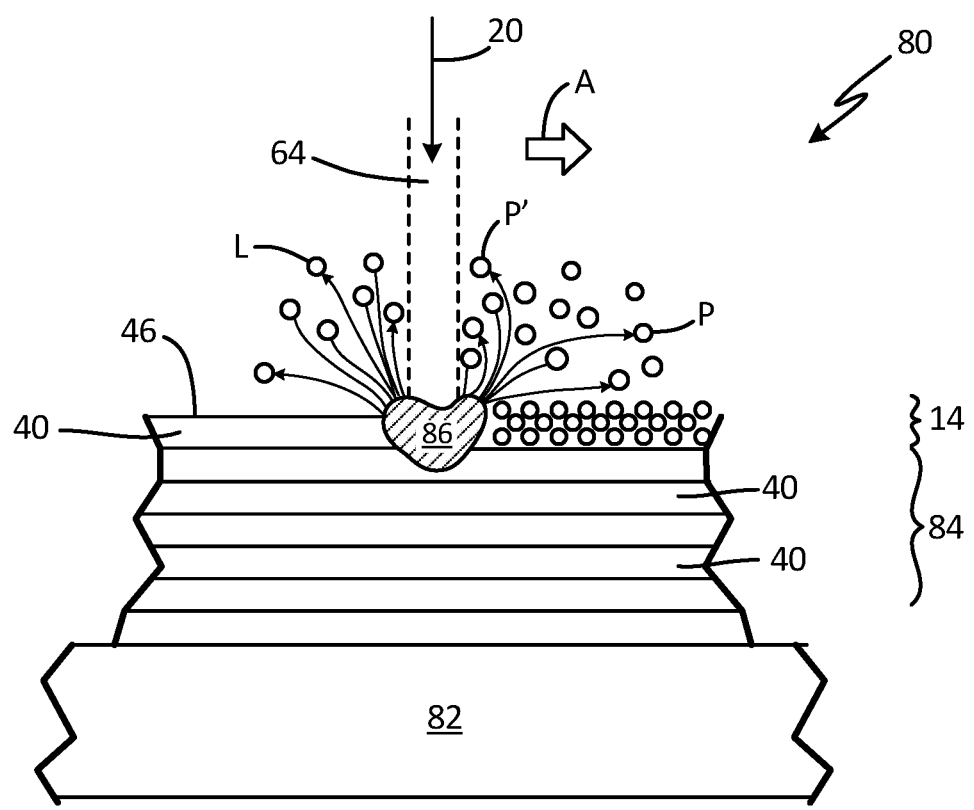
FIG. 2 is a schematic view of the interaction between a directed energy beam and a powder layer in the vicinity of a melt pool during an additive manufacturing process of the prior art.

A schematic view of the interaction between a directed energy beam and a powder layer in the vicinity of a melt pool during an additive manufacturing process of the prior art is shown in FIG. 2. Energy beam powder bed additive manufacturing process 80 comprises powder layer 14 on solidified multi-layer component 84 comprising solidified layers 40 on work table 82. High energy direct energy beam 64 from directed energy source 20 focused on powder layer 14 has sufficient energy to melt powder layers 14 to form melt pool 86. As indicated by arrow A, directed energy beam 64 is moving from left to right in the process of creating a portion of layer 40 (i.e. a weld bead) as the result of solidification of melt pool 86. For direct energy beam powder bed additive manufacturing processes operating in an inert atmosphere and illustrated in FIGS. 1 and 2, high energy x-ray videos have revealed that the sudden temperature rise of the melt pool, adjacent gas generated, and metal vaporization from the surface of the melt pool and weld bead, create thermally driven gas currents of sufficient turbulence and velocity to physically lift and relocate local metal powder particles P from powder layer 14 as well as liquid droplets L from the surface of melt pool 86. The movement of particles P and liquid droplets L are schematically illustrated by arrows in FIG. 2, and this material may or may not reenter the melt pool to restore alloy integrity of the solidified weld bead. This is a matter of considerable concerns in systems where the precursor powder composition is mixed and not chemically and/or physically homogeneous.

The above mentioned hot gas current driven disturbance of the metal powder particles negatively impacts the consistency of weld bead 40 in a number of ways. The number of metal powder particles available to feed local melt pool 86 may vary in an inconsistent manner. Lighter metal powder particles may be more readily displaced by the air currents than heavier particles. Because the particle size distribution varies in a random manner in each layer of powder 14, the number of particles that may be displaced away from the melt pool is constantly changing direction as directed energy beam 64 moves along the scan path. Both the volume and temperature of the melt pool are, therefore, subject to variation. In addition, the thermally driven air currents may be complex in nature. Some of the metal powder particles P and liquid droplets L may be pushed radially away from the melt pool. Other metal particles P' may be lifted but are captured by recirculating gas flow structures and partially melted as they pass through the laser beam and are either deposited on the weld bead or on the surrounding powder bed as shown in FIG. 2. These partially melted particles may subsequently create flaws in the form of local porosity and other forms of imperfection.

Figure 3:
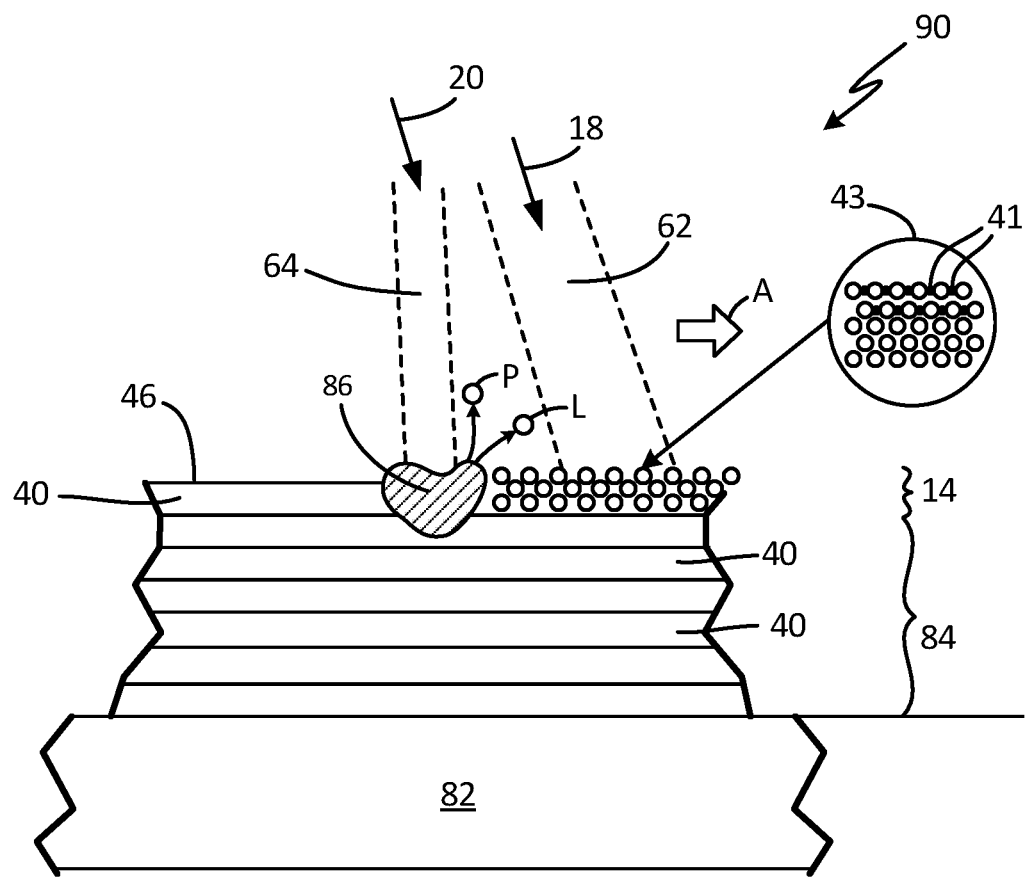
FIG. 3 is a schematic view of the interaction between a directed low energy beam, a directed high energy beam and a powder layer in the vicinity of a melt pool during an additive manufacturing process of a disclosed embodiment of the present invention.

A solution to the problem of lack of alloy consistency and other issues resulting from thermal disturbance of powder layer 14 during passage of directed energy beam 64 to form molten pool 86 is to physically stabilize powder layer 14 before the layer is impacted by energy beam 64. Such a system is shown in FIG. 3. Powder layer 14 can be physically stabilized against disturbance by lightly bonding particles together in the top region of layer 14 by a mild sintering operation. More specifically, a relatively low power directed energy beam 62 is employed to stabilize the top region of layer 14 by performing a partial sintering operation ahead of melt pool 86. Directed energy beam powder bed additive manufacturing process 90 comprises powder layer 14 on solidified multilayer component 84 comprising pre-solidified layers 40 on work table 82. Low power directed energy beam 62 from directed energy source 18 (shown in FIG. 1) and high power directed energy beam 64 from directed energy source 20 (shown in FIG. 1) are focused on powder layer 14 and moving in direction of arrow A. Low power directed energy beam 62 has sufficient energy to lightly sinter the top layers of layer 14 as schematically indicated by dark spots 41 at contact points between particles in enlarged inset 43 in FIG. 3. The partially-sintered top portion of layer 14 is a "skull" layer. The skull layer is part of layer 14 that is lightly sintered into a feature that is spaced apart from the fully-formed solidified layer 40. Thus, the skull layer is not yet connected to solidified layer 40 and there are metal powder particles positioned between solidified layer 40 and the skull layer. To further the fabrication of the skull layer, each powder particle can include a coating with a lower sintering temperature than the bulk of each powder particle.

In the dual-beam embodiment shown in FIGS. 1 and 3, high energy directed energy beam 64 from directed energy source 20 is focused on powder layer 14 and is moving in the direction of arrow A behind low energy directed energy beam 62 from low energy source 18. High energy directed energy beam 64 is forming melt pool 86 from powder layer 14 (including the skull layer) that solidifies to form part of solidified layer 40 in the form of a weld bead. The effect of the skull layer is schematically illustrated by ejection of few if any particles P or liquid droplets L in the vicinity of melt pool 86. Low energy directed energy beam 62 has a wider focal region to maximize the size of the sintered region in front of the focal point of high energy directed energy beam 64 to minimize the formation of particles and droplets ejected from molten pool 86.

In the embodiment shown in FIG. 3, two separate directed energy beams perform the function of sintering the skull layer of layer 14 before forming melt pool 86. In another embodiment, both functions could be formed by a single beam operating at two power levels and focal settings as the beam traverses across the surface of powder layer 14 on a scan path. The function of the low powered directed energy beam is to partially sinter to bond the metal particles in the top region of powder layer 14 ahead of and on both sides of the fusion melt pool scan path. The intent of this function is to provide a physically and chemically consistent volume of metal to melt pool 86 and to eliminate the deposition of partially melted powder particles in or on the weld bead.

In one embodiment, high energy directed energy beam 64 can raise the temperature of molten pool 86 to twice that of top layers 41 as they are sintered by low energy directed energy beam 62. In addition to and/or instead of having energy sources 18 and 20 be of differing power, source 18 can produce low energy directed energy beam 62 that moves faster than, is wider than, and/or has a smaller pulse width than high energy directed energy beam 64. In such an embodiment, only one energy source can be used to create both directed energy beams 62 and 64.

After the layers of component 84 are completed, component 84 can be blasted to remove any sintered powder that may be clinging to component 84 due to the formation of the skull layers. This finishing process can occur, for example, using the same powder that was used to make component 84 to avoid contamination of surplus hopper 32 (shown in FIG. 1), allowing reuse of excess powder 56 (shown in FIG. 1). In some instances, additional finishing steps can be performed to remove stray sintered powder from component 84, for example, ultrasonic vibration, grit blasting, water jetting, abrasive brushing, rotary abrasion, or other abrasive processes.

DISCUSSION OF POSSIBLE EMBODIMENTS

The following are non-exclusive descriptions of possible embodiments of the present invention.

A method of forming a metal component comprising: forming a first layer of metal powder on a work surface; heating firstly a first region of a top surface of the first layer with a low energy directed energy beam with a first diameter to a temperature at which the metal powder at or near the top surface is sintered to form a first skull on the first layer to encapsulate the metal powder in the first region to prevent powder loss during a second heating step; heating secondly a first spot of the first region of the first layer to a temperature at or above the melting point of the metal powder with a high energy directed energy beam with a second diameter to form a first molten pool; heating thirdly a second region of the top surface of the first layer upstream and adjacent the first molten pool with the low energy directed energy beam to a temperature at which the metal powder at or near the top surface is sintered to form a second skull on the first layer to encapsulate the metal powder in the second region to prevent powder loss during a fourth heating step; heating fourthly a second spot of the second region of the first layer to a temperature at or above the melting point of the metal powder with the high energy directed energy beam to form a second molten pool downstream from the first molten pool; heating fifthly a third region of the top surface of the first layer upstream and adjacent the molten pool with the low energy directed energy beam to a temperature at which the metal powder at or near the top surface is sintered to form a third skull on the first layer to encapsulate the metal powder in the third region to prevent powder loss during the a subsequent heating step; repeating the five previous heating steps until the top surface of the first layer comprises a fused surface; forming a second layer of metal powder on the first layer; and repeating the five heating steps, the repeating step, and the forming step until the metal component is formed.

The method of the preceding paragraph can optionally include, additionally and/or alternatively, any one or more of the following features, configurations and/or additional components:

Wherein the first diameter is from about 0.1 mm to about 1.0 mm.

Wherein the second diameter is from about 1.0 mm to about 10.0 mm.

Wherein the metal powder comprises a nickel base, cobalt base, iron base superalloy or mixtures thereof or a titanium alloy.

Wherein the method is performed in an inert atmosphere or a vacuum.

Wherein a low energy directed energy beam source and a high energy directed energy beam source are mounted on separate fixtures.

Wherein the low energy directed energy beam source and high energy directed energy beam source are mounted on a single fixture.

Wherein the metal component comprises an aircraft component.

Wherein the component comprises a turbine component.

Wherein a thickness of the first layer is from about 10 μm to about 150 μm.

An apparatus for forming a metal component from alloy powder comprising: a powder based layer-by-layer directed energy beam additive manufacturing system; a primary directed high energy beam configured to raise a temperature of the alloy powder to or above a melting point of the alloy powder; a secondary directed low energy beam configured to raise the temperature of the alloy powder to or above a sintering point of the alloy powder without reaching the melting point of the alloy powder; a sintered region on a surface of an alloy powder layer having been produced by the secondary directed low energy beam; and a solid region forming a portion of the metal component having solidified from a molten pool on the surface of the alloy powder layer adjacent to the first sintered region having been produced by the primary directed high energy beam.

The apparatus of the preceding paragraph can optionally include, additionally and/or alternatively, any one or more of the following features, configurations and/or additional components:

Wherein the primary directed energy beam is a laser with a beam diameter of from about 0.1 mm to about 1.0 mm.

Wherein the second directed energy beam is a laser with a beam diameter of about 1.0 mm to about 10.0 mm.

Wherein the first sintered region is comprised of partially sintered particles of powder that form a skull on the alloy powder layer to encapsulate the particles of powder to prevent powder loss during formation of the molten pool.

Wherein the powder layer thickness is from about 10 μm to about 150 μm.

Wherein a primary directed energy beam source and a secondary directed energy beam source are pulsed or continuous lasers.

Wherein the alloy powder is a nickel base, cobalt base, iron base superalloy or mixtures thereof or a titanium alloy.

Wherein the metal component is formed in a chamber having an inert atmosphere or a vacuum.

Wherein the metal component comprises an aircraft component.

Wherein the aircraft component comprises a turbine component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a metal component comprising:
   forming a first layer of metal powder on a work surface, the metal powder having a melting point;
   in a first heating step, heating a first region of a top surface of the first layer to a temperature at which the metal powder at or near the top surface is sintered to form a first skull on the first layer to encapsulate the metal powder in the first region to prevent powder loss during a second heating step, wherein the heating is performed using a low power energy beam having a first diameter and operating at a first power level;
   in a second heating step following the first heating step, heating a first spot of the first region of the first layer to a temperature at or above the melting point of the metal powder, by using a high power energy beam with a second diameter and operating at a second power level higher than the first power level to form a first molten pool;
   in a third heating step following the second heating step, heating a second region of the top surface of the first layer adjacent the first molten pool with the low power energy beam to a temperature at which the metal powder at or near the top surface is sintered to form a second skull on the first layer to encapsulate the metal powder in the second region so as to prevent powder loss during a fourth heating step;
   in the fourth heating step, following the third heating step, heating a second spot of the second region of the first layer to a temperature at or above the melting point of the metal powder by using the high power energy beam to form a second molten pool separate from the first molten pool;
   in a fifth heating step following the fourth heating step, heating a third region of the top surface of the first layer adjacent the second molten pool with the low power energy beam to a temperature at which the metal powder at or near the top surface is sintered to form a third skull on the first layer, such that the metal powder in the third region is encapsulated to prevent powder loss during a subsequent heating step;
   repeating the five previous heating steps until the top surface of the first layer comprises a fused surface;
   forming a second layer of metal powder on the first layer; and
   repeating the five heating steps, the repeating step, and the forming step until the metal component is formed;
   wherein each of the first, second, and third skulls are spaced apart from an underlying fused surface by metal powder particles.

2. The method of claim 1, wherein the first diameter is from about 0.1 mm to about 1.0 mm.

3. The method of claim 1, wherein the second diameter is from about 1.0 mm to about 10.0 mm.

4. The method of claim 1, wherein the metal powder comprises a nickel base, cobalt base, iron base superalloy or mixtures thereof or a titanium alloy.

5. The method of claim 1, wherein the method is performed in an inert atmosphere or a vacuum.

6. The method of claim 1, wherein a first source of the low power energy beam and a second source of the high power energy beam are mounted on separate fixtures.

7. The method of claim 1, wherein the first source and the second source are mounted on a single fixture.

8. The method of claim 1, wherein the metal component comprises an aircraft component.

9. The method of claim 8, wherein the component comprises a turbine component.

10. The method of claim 1, wherein a thickness of the first layer is from about 10 μm to about 150 μm.

* * * * *